United States Patent
Stevenson et al.

(10) Patent No.: US 11,601,490 B2
(45) Date of Patent: *Mar. 7, 2023

(54) VISUALIZATION AND INTERACTION OF 3D MODELS VIA REMOTELY RENDERED VIDEO STREAM SYSTEM AND METHOD

(71) Applicant: AVEVA Software, LLC, Lake Forest, CA (US)

(72) Inventors: David Matthew Stevenson, Cambridge (GB); Paul Antony Burton, Cambridgeshire (GB); Mira Witczak, Royston (GB)

(73) Assignee: AVEVA Software, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,146

(22) Filed: Jun. 25, 2021

(65) Prior Publication Data

US 2021/0352126 A1 Nov. 11, 2021

Related U.S. Application Data

(63) Continuation of application No. 16/566,300, filed on Sep. 10, 2019, now Pat. No. 11,075,972.

(60) Provisional application No. 62/729,935, filed on Sep. 11, 2018, provisional application No. 62/729,307, filed on Sep. 10, 2018.

(51) Int. Cl.
| | |
|---|---|
| *G06T 19/00* | (2011.01) |
| *H04L 65/75* | (2022.01) |
| *H04L 67/10* | (2022.01) |
| *G06T 1/20* | (2006.01) |

(Continued)

(52) U.S. Cl.
CPC .............. *H04L 65/764* (2022.05); *G06T 1/20* (2013.01); *G06T 17/00* (2013.01); *G06T 19/00* (2013.01); *H04L 65/65* (2022.05); *H04L 67/10* (2013.01); *G06T 2200/16* (2013.01)

(58) Field of Classification Search
None
See application file for complete search history.

(56) References Cited

U.S. PATENT DOCUMENTS

| | | |
|---|---|---|
| 8,427,491 B2 | 4/2013 | Keslin |
| 2002/0015042 A1 | 2/2002 | Robotham et al. |

(Continued)

FOREIGN PATENT DOCUMENTS

| | | |
|---|---|---|
| JP | 2014504409 A | 2/2014 |
| KR | 10-2017-0041905 A | 4/2017 |
| KR | 10-2018-0082170 A | 7/2018 |

OTHER PUBLICATIONS

International Search Report and Written Opinion for International Application No. PCT/US2019/050451, dated Dec. 26, 2019, 9 pages.

(Continued)

*Primary Examiner* — Robert J Craddock
(74) *Attorney, Agent, or Firm* — Greenberg Traurig, LLP

(57) ABSTRACT

The disclosure is directed to systems and methods for local rendering of 3D models which are then accessed by remote computers. The advantage of the system is that extensive hardware needed for rendering complex 3D models is centralized and can be accessed by smaller remote computers without and special hardware or software installation. The system also provides enhanced security as model data can be restricted to a limited number of servers instead of stored on individual computers.

17 Claims, 3 Drawing Sheets

(51) Int. Cl.
*G06T 17/00* (2006.01)
*H04L 65/65* (2022.01)

(56) References Cited

U.S. PATENT DOCUMENTS

| | | |
|---|---|---|
| 2010/0302143 A1 | 12/2010 | Spivack |
| 2011/0157196 A1 | 6/2011 | Nave et al. |
| 2012/0154389 A1 | 6/2012 | Bohan et al. |
| 2013/0044128 A1 | 2/2013 | Liu et al. |
| 2014/0108967 A1 | 4/2014 | Markham et al. |
| 2015/0262421 A1 | 9/2015 | Bell et al. |
| 2016/0330493 A1 | 11/2016 | Chuah et al. |
| 2016/0358383 A1 | 12/2016 | Gauglitz et al. |
| 2017/0180756 A1 | 6/2017 | Tuffreau et al. |

OTHER PUBLICATIONS

Lamberti et al., "A Streaming-Based Solution for Remote Visualization of 3D Graphics on Mobile Devices", Apr. 2007, IEEE Transactions on Visualization and Computer Graphics, pp. 247-260.

Grigg et al., "Communication versus computation: A survey of cloud gaming approaches Author Link to published version", 18th International Conference on Intelligent Games and Simulation, Game-On 2017, Sep. 6, 2017, 17 pages.

"3D Gaming Graphics Delivery Overview", ETSI Draft; 00010V005, European Telecommunications Standards Institute (ETSI), 650, Route Des Lucioles; F-06921 Sophia-Antipolis; France, No. V0.0.50, Jul. 9, 2010, 21 pages.

Acosta et al., "Real-time Interactions and Synchronization of Voxel-based Collaborative Virtual Environments", 3D User Interfaces, 2007. 3DUI '07. IEEE Symposium On, IEEE, Piscataway, NJ, USA, Mar. 1, 2007, 7 pages.

Lavric et al., "Draft of White Paper on ARAF 2nd Edition", 113. MPEG Meeting; Oct. 19, 2015-Oct. 23, 2015; Geneva; No. m37414 Oct. 17, 2015, 19 pages.

VISUALIZATION AND INTERACTION OF 3D MODELS VIA REMOTELY RENDERED VIDEO STREAM SYSTEM AND METHOD

RELATED APPLICATIONS

This application is a Continuation Application of U.S. patent application Ser. No. 16/566,300, filed Sep. 10, 2019, entitled "VISUALIZATION AND INTERACTION OF 3D MODELS VIA REMOTELY RENDERED VIDEO STREAM SYSTEM AND METHOD", which claims the benefit of and priority to U.S. Provisional Patent Application No. 62/729,307, filed Sep. 10, 2018, entitled "VISUALIZATION AND INTERACTION OF 3D MODELS VIA REMOTELY RENDERED VIDEO STREAM SYSTEM AND METHOD", and U.S. Provisional Patent Application No. 62/729,935, filed Sep. 11, 2018, entitled "VISUALIZATION AND INTERACTION OF 3D MODELS VIA REMOTELY RENDERED VIDEO STREAM SYSTEM AND METHOD", the entire contents of which are incorporated herein by reference.

BACKGROUND 3D models generated by industrial control and monitoring software platforms are growing larger and more complex, leading to an increase in the hardware requirements of any computer attempting to process and visualize data. Some system providers use some form of server-side rendering producing images using ray-tracing. Other video streaming technology is widespread, (e.g. Skype), but only streams self-created content. Some technologies, such as WebRTC, provide the capabilities to perform low latency streaming of video and communications, but is only a framework or SDK for doing so, and exclude generating the encoded content.

SUMMARY

According to various embodiments, systems and methods described herein are directed toward facilitating a rendering of three dimensional (3D) models generated at a local computer that can be manipulated using a remote computer (e.g., providing a visualization server process delivering interactive video streams of rendered 3D data to one or more network connections which have video playback capability). Advantages to local rendering of 3D models include the ability to upgrade local equipment when needed to support ever increasing complex 3D models, while gaining the ability to render 3D images on any remote computer that can support video streaming according to some embodiments. In some embodiments, the system uses a graphics processing unit (GPU) in combination with one or more processors and non-transitory computer readable mediums located at the local site to generate the 3D model. In some embodiments, a rendering of the 3D model is delivered to one or more remote computers over a connection as a video stream. The user can then manipulate the 3D model using various commands according to some embodiments. The system greatly reduces the impact of latency to the user's experience, and provide greater security due to being accessible only within a local network according to various embodiments. In some embodiments, the latency is less than 50 ms. By centralizing the 3D data on a locally-accessible on-premises network, in some embodiments 3D models become highly accessible without need to replicate and/or copy the same 3D model on to each individual remote computer. This also provides enhanced security as model data usage may be restricted to a specific number of computers instead of multiple end user computers according to some embodiments. In addition, in some embodiments, multiple remote computers can access the same 3D model on the local computer intermittently or simultaneously.

Some embodiments of the invention include a system and process that can be hosted on any computer that awaits client connections. Some embodiments of the invention enable rendering remotely such that any computer able to display a rendering of one or more complex models without requiring any special hardware or software installation. In some embodiments, the connections can be used to send a real-time video stream generated by rendering a nominated 3D model on the local computer and encoding each frame at interactive rates. In some embodiments, the rendering from the local computer is delivered to the remote computer in the form of a video stream.

In some embodiments, once streaming begins, the remote computer can interact with the rendering to allow navigation, picking, panning, zooming, and other 3D model interactions by sending simple JavaScript Object Notation (JSON) commands to the local computer. In some embodiments, interactions that have a visual impact on the 3D view (e.g. change of view point) can trigger a new frame to be rendered on the local computer and streamed to the user as part of the video stream. Following a feedback loop of interacting, rendering, and/or streaming, the user can interact freely with a rendering of a 3D model on their remote computer according to some embodiments.

Some embodiments of the system can facilitate connections established by standard communication or streaming technology, including, but not limited to, H.264 video encoding and decoding, application programming interfaces (APIs), and HTML5 WebSockets. In some embodiments, this allows a high degree of compatibility across different operating systems, enabling future applications to be web based (e.i., local computers accessed by remote computers through the web), rather than requiring the need to write multiple versions of applications or software for each supported operating system. In some embodiments, a GPU rasterizer can be utilized for streaming, thereby making it highly interactive (e.g., such as with the use of 30 Hz frame-rates). In some embodiments, any visualization using standard video streams can be produced without the need for any additional software/plugins except a standard HTML5 browser that supports Media Source Extensions and H264 encoded video, for example.

In some embodiments, the system can enable one or many local computer server processes running across multiple computers, virtual machines, and/or servers concurrently to support any number of remote computers.

Some embodiments can use GPU video encoders to produce the video stream from frames generated by a rendering engine (e.g., such as an AVEVA rendering engine). In some embodiments, ensuring high utilization of the GPU during both rendering and encoding of the 3D model can result in low latency following remoter computer interaction. The low latency is less than or equal to 50 ms in various embodiments.

In some embodiments, at least one local computer can host one or more virtual and/or physical computers that can each run one or more servers to handle one or more incoming remote client requests from remote computers. In some embodiments, it is the responsibility of the remote computer to decode the video stream. In some embodiments, the video stream can be compatible with Media Source Extensions (MSE) to ensure good playback performance.

In some embodiments, a remote computer can couple to a local computer via a WebSocket and send a command to render a 3D model. In some embodiments, this action can reserve some GPU resources to render the 2D frame for encoding: an MP4 movie header is sent to the remote client to indicate the start of the video stream in some embodiments.

In some embodiments, a remote computer can issue commands to interact with the 3D model. In some non-limiting embodiments, the commands are issued via a mouse movement and/or click, finger touch, hand gesture, eye movement tracking, or any other method to send a digital signal. In some embodiments, the command modifies the local 3D model and triggers a new frame to be rendered and sent to a hardware encoder, and the new frame is then sent to the remote client as the next P-frame (delta from previous image). In some embodiments, the use of one or more hardware encoders and a high GPU/low CPU combination delivers the low latency required for such interaction.

DETAILED DESCRIPTION

Figure 1:
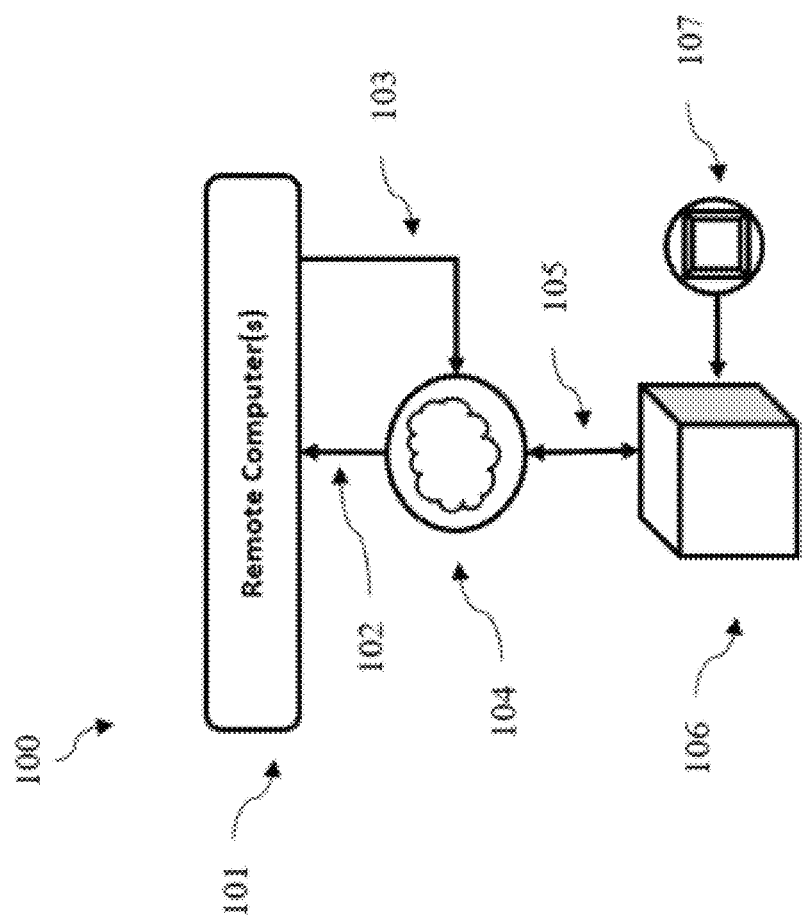
FIG. 1 illustrates a system architecture according to some embodiment.

FIG. 1 illustrates a system architecture 100 according to some embodiments. In some embodiments, a remote computer 101 facilitates a connection 102, 103 with a network 104 that is in connection 105 with a local computer 106; the connection 102, 103 facilitates video streaming 102 and commands 103 in some embodiments. 3D model data 107 is uploaded to and/or stored on local computer 106, according to some embodiments, where it is transformed into a 3D model rendering. In some embodiments, the 3D model rendering is sent to the remote computer 101 through the network 104 and arrives as a video stream 102. The 3D model rendering can then be given 3D model manipulation commands 103 at the remote computer 101. The 3D model manipulation commands 103 are then sent back through the network 104 to the local computer 106 in some embodiments. At this time, in various embodiments, the local computer 106 manipulates the 3D model rendering according to the commands 103. In various embodiments, a new 3D rendering is then sent back to the remote computer 101 through network 104, where it arrives at the remote computer 101 in the form of a video stream 102. According to various embodiments, the process described above repeats as many times as needed by the user to manipulate the 3D model as desired.

Figure 2:
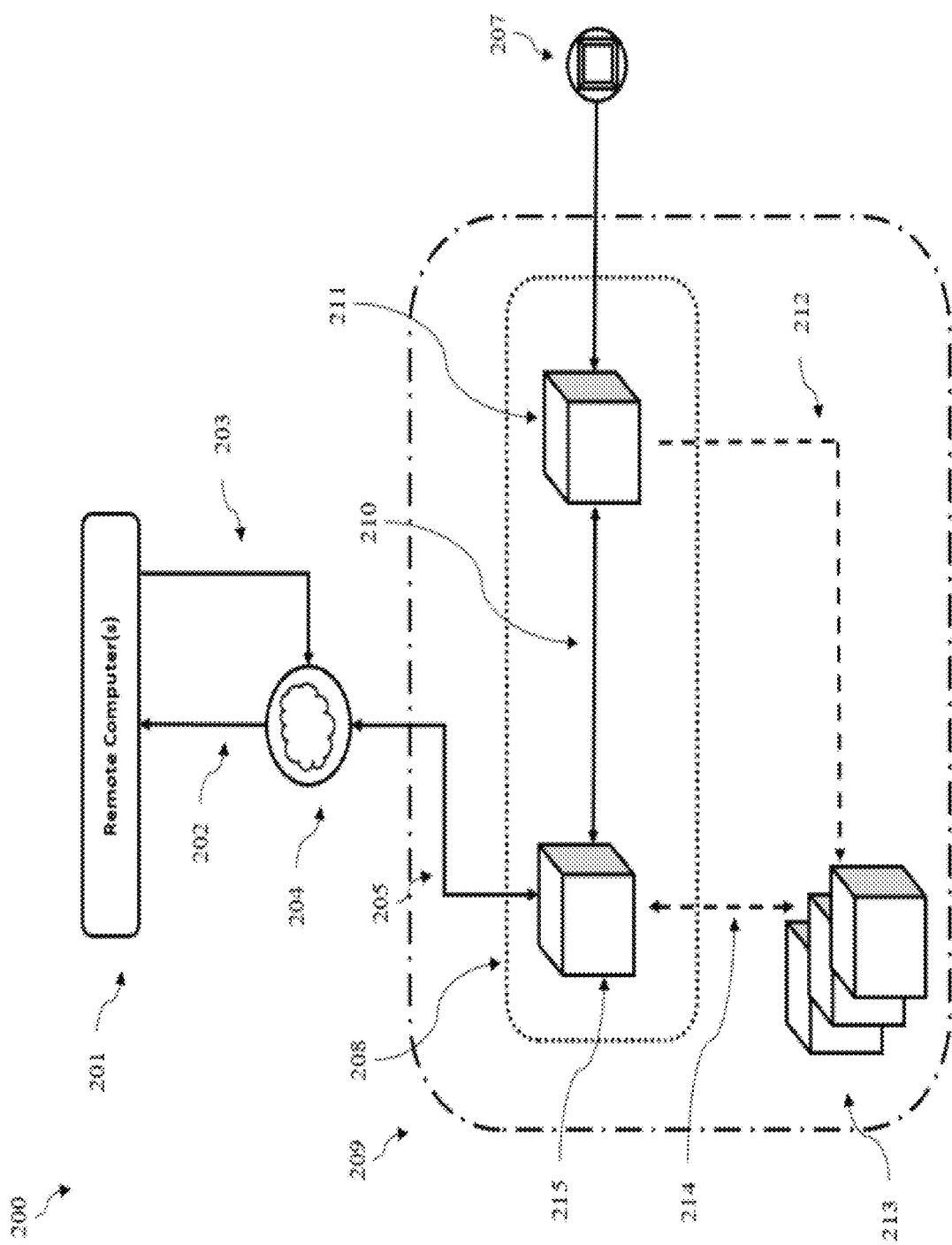
FIG. 2 illustrates a cloud based system architecture according to some embodiments.

FIG. 2 illustrates a cloud based system architecture 200 according to some embodiments. Similar to FIG. 1, in some embodiments a remote computer 201 facilitates a connection 202, 203 with a network 204 that is in connection 205 with a local cloud computer 209. The connection 202, 203 facilitates video streaming 202 and commands 203 in some embodiments. In some embodiments, the local cloud computer 209 comprises a proxy server 215, a video server 211, each in connection 210 with the other and associated with an instance 208. 3D model data 207 is uploaded to and/or stored on video server 211, according to some embodiments, where it is transformed into a 3D model rendering. In some embodiments, the 3D model rendering is sent to the remote computer 201 through the proxy server 215 and network 204 and arrives as a video stream 202. The 3D model rendering can then be given 3D model manipulation commands 203 at the remote computer 201. The 3D model manipulation commands 203 are then sent back through the network 204 to the local cloud computer 209 in some embodiments. At this time, in various embodiments, the local cloud computer 209 manipulates the 3D model rendering according to the commands 203. In various embodiments, a new 3D rendering is then sent back to the remote computer 201 through network 204, where it arrives at the remote computer 201 in the form of a video stream 202. According to various embodiments, the process described above repeats as many times as needed by the user to manipulate the 3D model as desired.

In some embodiments, if the 3D model data 207 is too large or complex for video server 211 to handle, additional servers 213 can be called 212 to support video server 211, or can be used in place of video server 211: multiple servers can comprise portions of the rendered 3D model according to some embodiments. According to various embodiments, additional servers 213 can be physical or virtual servers in communication 214 with proxy server 215.

Figure 3:
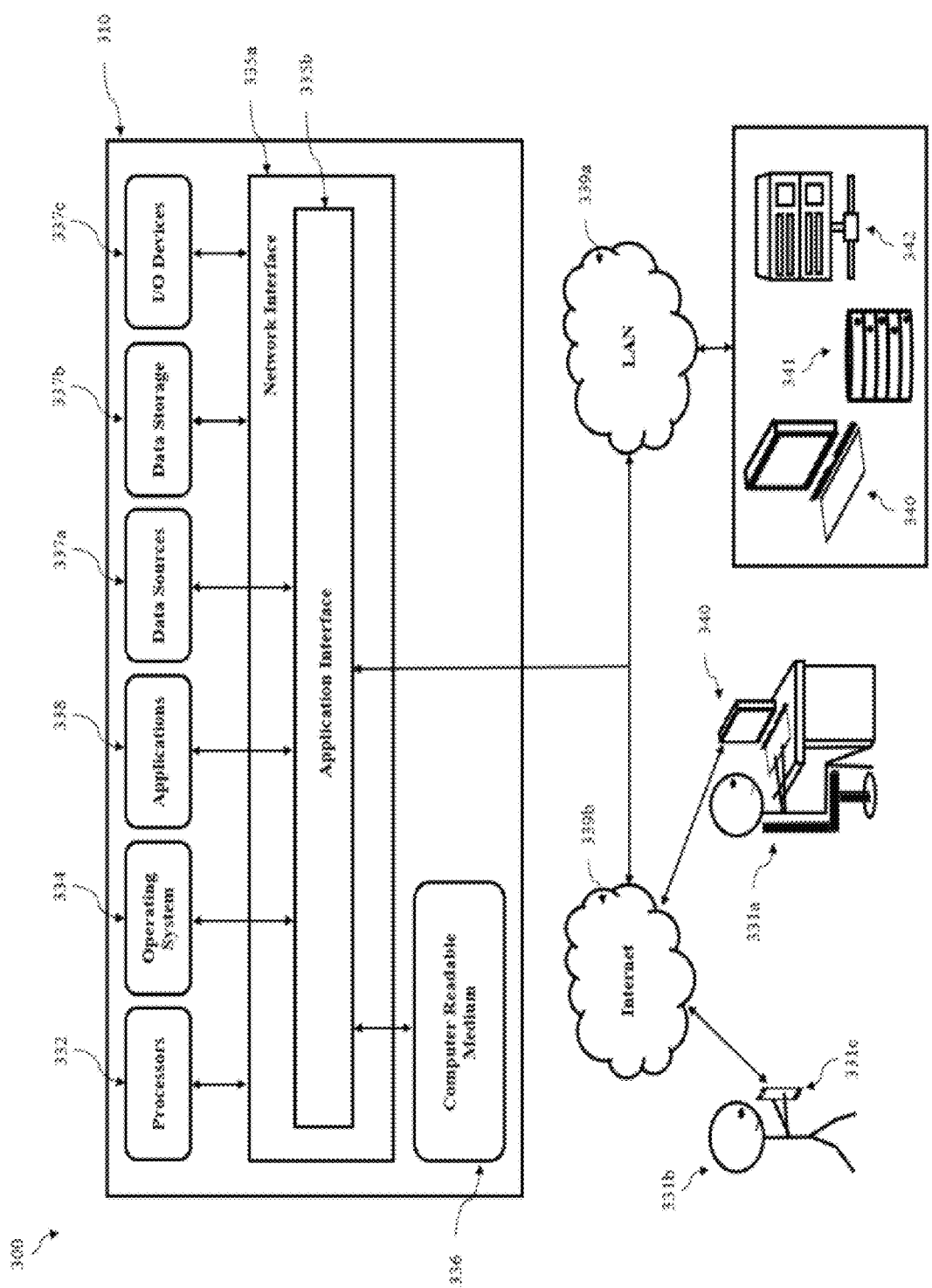
FIG. 3 illustrates a computer system enabling or comprising the systems and methods in accordance with some embodiments.

FIG. 3 illustrates a computer system enabling or comprising the systems and methods in accordance with some embodiments. In some embodiments, the computer system 210 can include and/or operate and/or process computer-executable code of one or more of the above-mentioned software modules and/or systems. Further, in some embodiments, the computer system 310 can operate and/or display information within one or more graphical user interfaces (GUIs) using a computer. In some embodiments, the computer system 210 can comprise the cloud and/or can be coupled to one or more cloud-based server systems.

In some embodiments, the system 310 can comprise at least one computer including at least one processor 332. In some embodiments, the at least one processor 332 can include a processor residing in, or coupled to, one or more server platforms. In some embodiments, the system 310 can include a network interface 335a and an application interface 335b coupled to the least one processor 332 capable of processing at least one operating system 334. Further, in some embodiments, the interfaces 335a, 335b coupled to at least one processor 332 can be configured to process one or more of the software modules (e.g., such as enterprise applications 238). In some embodiments, the software modules 338 can include server-based software, and can operate to host at least one user account and/or at least one client account, and operating to transfer data between one or more of these accounts using the at least one processor 332.

The invention can employ various computer-implemented operations involving data stored in computer systems according to some embodiments. Moreover, the above-described databases and models described throughout can store analytical models and other data on computer-readable storage media within the system 310 and on computer-readable storage media coupled to the computer system 310 in some embodiments. In addition, in some embodiments, the above-described applications of the system can be stored on computer-readable storage media within the computer system 210 and on computer-readable storage media coupled to the computer system 210. These operations, according to various embodiments, are those requiring physical manipulation of physical quantities. Usually, though not necessarily, in some embodiments these quantities take the form of electrical, electromagnetic, or magnetic signals, optical or magneto-optical form capable of being stored, transferred, combined, compared and otherwise manipulated. In some embodiments, the system 310 can comprise at least one computer readable medium 336 coupled to at least one data source 337*a*, and/or at least one data storage 337*b*, and/or at least one input/output 337*c*. In some embodiments, the computer system can be embodied as computer readable code on a computer readable medium 336. In some embodiments, the computer readable medium 336 can be any data storage that can store data, which can thereafter be read by a computer system (such as the system 310). In some embodiments, the computer readable medium 336 can be any physical or material medium that can be used to tangibly store the desired information or data or instructions and which can be accessed by a computer or processor 332. In some embodiments, the computer readable medium 336 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 336 can transmit or carry instructions to a computer 340 and/or at least one user 331, including a router, private or public network, or other transmission apparatus or channel, both wired and wireless. In some embodiments, the software modules 338 can be configured to send and receive data from a database (e.g., from a computer readable medium 336 including data sources 337*a* and data storage 337*b* that can comprise a database), and data can be received by the software modules 338 from at least one other source. In some embodiments, at least one of the software modules 338 can be configured within the system to output data to at least one user 331 via at least one graphical user interface rendered on at least one digital display.

In some embodiments, the computer readable medium 336 can be distributed over a conventional computer network via the network interface 335*a* where the system embodied by the computer readable code can be stored and executed in a distributed fashion. For example, in some embodiments, one or more components of the system 210 can be coupled to send and/or receive data through a local area network ("LAN") 339*a* and/or an internet coupled network 339*b* (e.g., such as a wireless internet). In some further embodiments, the networks 339*a*, 339*b* can include wide area networks ("WAN"), direct connections (e.g., through a universal serial bus port), or other forms of computer-readable media 336, or any combination thereof.

In some embodiments, components of the networks 339*a*, 339*b* can include any number of user computers such as personal computers including for example desktop computers, and/or laptop computers, or any fixed, generally non-mobile internet appliances coupled through the LAN 339*a*. For example, some embodiments include personal computers 340*a* coupled through the LAN 339*a* that can be configured for any type of user including an administrator. Other embodiments can include personal computers coupled through network 339*b*. In some further embodiments, one or more components of the system 310 can be coupled to send or receive data through an internet network (e.g., such as network 339*b*). For example, some embodiments include at least one user 331 coupled wirelessly and accessing one or more software modules of the system including at least one enterprise application 338 via an input and output ("I/O") 337*c*. In some other embodiments, the system 310 can enable at least one user 331 to be coupled to access enterprise applications 338 via an I/O 337*c* through LAN 339*a*. In some embodiments, the user 331 can comprise a user 331*a* coupled to the system 310 using a desktop computer, and/or laptop computers, or any fixed, generally non-mobile internet appliances coupled through the internet 339*b*. In some further embodiments, the user 331 can comprise a mobile user 331*b* coupled to the system 310. In some embodiments, the user 331*b* can use any mobile computer 331*c* to wireless coupled to the system 210, including, but not limited to, personal digital assistants, and/or cellular phones, mobile phones, or smart phones, and/or pagers, and/or digital tablets, and/or fixed or mobile internet appliances.

According to some embodiments, any of the operations described herein that form part of the system are useful machine operations. The system also relates to an apparatus for performing these operations in some embodiments. In some embodiments, the apparatus can be specially constructed for the required purpose, such as a special purpose computer. When defined as a special purpose computer, in some embodiments, the computer can also perform other processing, program execution, or routines that are not part of the special purpose, while still being capable of operating for the special purpose. In various embodiments, the operations can be processed by a general-purpose computer selectively activated or configured by one or more computer programs stored in the computer memory, cache, or obtained over a network. When data is obtained over a network the data can be processed by other computers on the network, e.g. a cloud of computing resources in some embodiments.

The embodiments of the system can also be defined as a machine that transforms data from one state to another state. The data can represent an article, that can be represented as an electronic signal and electronically manipulate data in various embodiments. The transformed data can, in some embodiments, be visually depicted on a display, representing the physical object that results from the transformation of data. The transformed data can be saved in some embodiments to storage generally, or in formats that enable the construction or depiction of a physical and tangible object. In some embodiments, the manipulation can be performed by a processor. According to some embodiments, the processor transforms the data from one thing to another. Some embodiments include methods can be processed by one or more machines or processors that can be connected over a network. Each machine can transform data from one state or thing to another, and can also process data, save data to storage, transmit data over a network, display the result, or communicate the result to another machine in various embodiments. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, instances, or other data according to some embodiments.

Although method operations can be described in a specific order, in some embodiments other housekeeping operations can be performed in between operations, or operations can be adjusted so that they occur at slightly different times, or can be distributed in a system which allows the occurrence of the processing operations at various intervals associated with the processing as long as the processing of the overlay operations are performed in the desired way.

It will be appreciated by those skilled in the art that while the system has been described above in connection with embodiments, drawings, and examples, the invention is not necessarily so limited: numerous other embodiments, examples, uses, modifications and departures from the presented embodiments are intended to be encompassed by the description herein. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, and includes any wireless connection that facilitates the transfer of data.

The word "computer" encompasses any one of or combination of one or more processors, computer-readable mediums (e.g., computer memory), displays, speakers, wired and wireless communication and data transfer components, clients, servers, APIs, databases, and related hardware and software according to some embodiments. In some embodiments, "computer" can also be a reference to a desktop computer, a smart phone, PDA, tablet, radio, and the like, any of which can comprise one or more of the software and hardware mentioned above.

In some embodiments, the local cloud computer can comprise Amazon Web Services (AWS) for example, but is broadly applicable to any other cloud platform such as Microsoft Azure.

AVEVA, the AVEVA logos and AVEVA product names are trademarks or registered trademarks of AVEVA Group plc or its subsidiaries in the United Kingdom and other countries. Windows and Azure are registered trademarks of Microsoft Corporation in the United States and other countries. Amazon and Amazon Web Services are registered trademarks of Amazon Incorporated.

The invention claimed is:

1. A system for facilitating remote visualization and interaction of three dimensional (3D) models comprising:
   at least one local processor;
   at least one local non-transitory computer-readable medium;
   at least one remote processor;
   at least one remote non-transitory computer-readable medium;
   wherein the at least one local non-transitory computer-readable medium comprises local instructions configured and arranged for execution using the at least one local processor,
   wherein the local instructions comprise:
      creating a local 3D model,
      executing local 3D model manipulation, and
      executing a connection between the at least one local processor and the at least one remote processor;
   wherein the at least one remote non-transitory computer-readable medium comprises remote instructions configured and arranged for execution using the at least one remote processor,
   wherein the remote instructions comprise:
      executing remote commands,
      executing remote 3D model manipulation of the local 3D model using the remote commands, and
      generating a remote rendering of the local 3D model created by the local instructions;
   wherein the at least one remote processor comprises multiple remote processors;
   wherein each of the multiple remote processors are configured to execute a different remote 3D model manipulation of the local 3D model at least one of intermittently or simultaneously.

2. The system of claim 1,
   wherein generating the remote rendering of the local 3D model is achieved by using a video playback code executed by the at least one remote processor.

3. The system of claim 2,
   wherein the video playback code comprises one or more of JavaScript Object Notation (JSON), H.264 video streaming, and HTML5 websockets.

4. The system of claim 1,
   wherein creating the local 3D model and/or executing the local 3D model manipulation comprises using a graphics processing unit (GPU).

5. The system of claim 1,
   wherein the connection comprises the at least one local processor returning the local 3D model manipulation to the at least one remote processor as a video stream.

6. The system of claim 1,
   wherein a latency of the remote rendering of the local 3D model after executing the remote commands is less than 50 milliseconds.

7. The system of claim 1,
   wherein a cloud based computer system comprises the at least one local processor and/or the at least one local non-transitory computer-readable medium.

8. A system for facilitating remote visualization and interaction of three dimensional (3D) models comprising:
   at least one local computer;
   at least one remote computer;
   wherein the at least one local computer comprises at least one local processor and is configured and arranged to execute local instructions stored on at least one local non-transitory computer-readable medium,
   wherein the local instructions comprise:
      generating, by the at least one local processor, a local 3D model,
      executing, by the at least one local processor, local 3D model manipulation, and
      executing, by the at least one local processor, a connection between the at least one local computer and the at least one remote computer;
   wherein the at least one remote computer comprises at least one remote processor and is configured and arranged to execute remote instructions stored on at least one remote non-transitory computer-readable medium,
   wherein the remote instructions comprise:
      executing, by the at least one remote processor, remote commands,
      executing, by the at least one remote processor, remote 3D model manipulation of the local 3D model using the remote commands, and
      generating, by the at least one remote processor, a remote rendering of the local 3D model created by the local instructions; and
   wherein a latency of the remote rendering of the local 3D model after executing the remote commands is less than 50 milliseconds.

9. The system of claim 8,
wherein generating the remote rendering and/or the local 3D model manipulation is achieved by using video streaming code executed by the at least one remote computer.

10. The system of claim 9,
wherein the video streaming code comprises one or more of JavaScript Object Notation (JSON), H.264 video streaming, and HTML5 Web Sockets.

11. The system of claim 8,
wherein creating the local 3D model and/or executing the local 3D model manipulation comprises using a graphics processing unit (GPU).

12. The system of claim 11,
wherein the connection comprises the at least one local computer returning the local 3D model manipulation to the at least one remote processor as a video stream.

13. The system of claim 8,
wherein the at least one remote computer comprises multiple remote computers;
wherein the multiple remote computers are each configured to execute the connection with any one of the at least one local computer;
wherein each of the multiple remote computers are configured to execute a different remote 3D model manipulation of the local 3D model.

14. The system of claim 13,
wherein the each of the multiple remote computers are configured to execute the different remote 3D model manipulation of the local 3D model simultaneously.

15. The system of claim 8,
wherein a cloud based computer system comprises the at least one local computer.

16. A method for facilitating remote visualization and interaction of three dimensional (3D) models comprising steps of:
providing at least one local computer;
providing a plurality of remote computers;
configuring the at least one local computer to execute local instructions stored on at least one local non-transitory computer readable medium,
wherein the local instructions comprise steps of:
generating a local 3D model,
executing local 3D model manipulation, and
executing a connection between the at least one local computer and the plurality of remote computers;
configuring each of the plurality of remote computers to execute remote instructions,
wherein the remote instructions comprise steps of:
executing remote commands,
executing the connection between the at least one local computer and the plurality of remote computers,
executing remote 3D model manipulation of the local 3D model using the remote commands, and
generating a remote rendering of the local 3D model created by the local instructions;
wherein the each of the plurality of remote computers are configured to execute a different remote 3D model manipulation of the local 3D model at least one of intermittently or simultaneously.

17. The method of claim 16,
wherein a cloud based computer system comprises the at least one local computer.

* * * * *